No. 873,150.
PATENTED DEC. 10, 1907.
J. F. BROWER.
CARVING FORK.
APPLICATION FILED MAY 31, 1906.
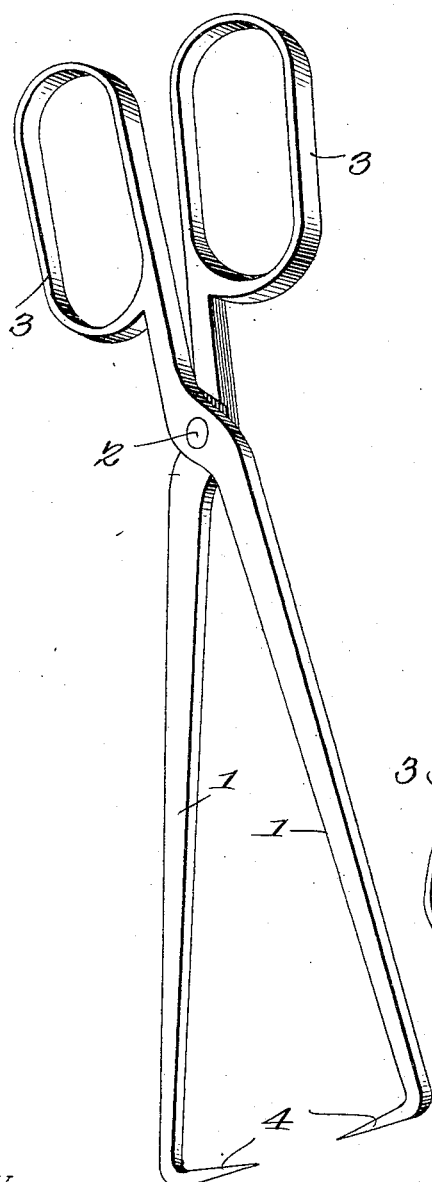
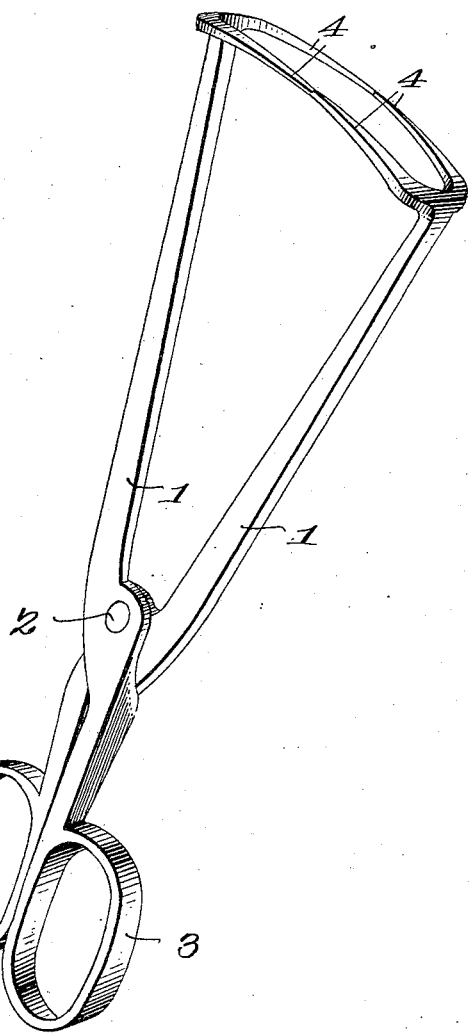
WITNESSES:
E. W. Stewart
J. A. Bishop.
James F. Brower,
INVENTOR.
By C. A. Snow & Co.
ATTORNEYS
THE NORRIS PETERS CO., WASHINGTON, D. C.

UNITED STATES PATENT OFFICE.

JAMES F. BROWER, OF RODNEY, MICHIGAN, ASSIGNOR OF ONE-HALF TO EDWARD F. KETCHUM, OF RODNEY, MICHIGAN.

CARVING-FORK.

No. 873,150.     Specification of Letters Patent.     Patented Dec. 10, 1907.

Application filed May 31, 1906. Serial No. 319,579.

*To all whom it may concern:*

Be it known that I, JAMES F. BROWER, a citizen of the United States, residing at Rodney, in the county of Mecosta and State of Michigan, have invented a new and useful Carving-Fork, of which the following is a specification.

This invention relates to utensils for use in carving and its object is to provide a utensil by means of which the meat to be carved can be securely held, the gripping of said utensil upon the meat increasing in proportion to the grip exerted upon the utensil by the user thereof.

A still further object is to provide a utensil of this character made up of oppositely disposed pronged members having handle portions, said members being spaced apart at all times from their points of intersection so that they will not have a cutting or crushing action upon the meat engaged thereby.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a perspective view of one form of the utensil; and Fig. 2 is a perspective view of a modified form.

Referring to the figures by characters of reference, 1, 1 designate oppositely disposed shanks which are pivotally connected as at 2, the handle portions 3 of said shanks being preferably formed of rings into which the fingers of the operator are designed to project. Moreover, these handle portions are so arranged that when they are drawn together by the hand of the operator grasping the same the shanks 1 are also drawn toward each other but can at no time be brought into contact but are instead always spaced apart. Each of the shanks shown in Fig. 1 has a prong 4 extending therefrom. The two prongs are arranged in alinement and are designed, when the handle portions are moved into contact to abut at their points. In the form of utensil shown in Fig. 2 two prongs 4 are arranged at the free end of each shank and these prongs are likewise designed to contact when the handle portions are pressed together.

It will be understood that with this construction when it is desired to hold meat to be carved the handle portions 3 are swung apart so as to cause a corresponding movement of the prongs 4. The shanks are then placed at opposite sides of the meat and the operator grasps the handle portions 3 and draws them together. This will cause the prongs to bite into the meat and before the shanks 1 can cut into or crush the same the movement of the prongs is limited by the handle portions coming into contact with each other. When the operator grasps the handle portions the obvious tendency is to draw them together and therefore there is no danger of the prongs swinging apart while the utensil is being held during the carving operation.

What is claimed is:

A utensil comprising crossed oppositely disposed shanks, said shanks being pivotally connected at their points of intersection, each shank having a handle at one end and a prong extending at right angles from its other end, said prongs and handles being disposed to simultaneously contact when the handles are drawn together, said shanks being constantly spaced apart from their points of intersection to their pronged ends.

In testimony that I claim the foregoing as my own, I have hereto affixed my signature in the presence of two witnesses.

JAMES F. BROWER.

Witnesses:
A. M. TRAXLER,
ARCHIE BROOMFIELD.